United States Patent [19]

Terry

[11] 4,313,513

[45] Feb. 2, 1982

[54] SELF REGULATING AIR BEARING

[76] Inventor: Melvin D. Terry, P.O. Box 7174, Seattle, Wash. 98133

[21] Appl. No.: 159,488

[22] Filed: Jun. 16, 1980

[51] Int. Cl.³ .............................................. B60V 1/16
[52] U.S. Cl. ................................. 180/124; 308/5 R; 308/DIG. 1
[58] Field of Search .............. 180/124, 125; 308/5 R, 308/DIG. 1, 9, 122, 170

[56] References Cited

U.S. PATENT DOCUMENTS 3,513,935  5/1970  Noble ................................. 180/124
3,513,936  5/1970  Crowley et al. ..................... 180/124
3,613,822  10/1971  Mackie et al. ....................... 180/24
3,618,694  11/1971  Crowley ............................. 180/124

Primary Examiner—Lenard A. Footland
Attorney, Agent, or Firm—Cole, Jensen & Puntigam

[57] ABSTRACT

A fluid bearing having improved operating characteristics. The platform to which the bearing is attached and which supports any load includes the necessary conduits for supply of fluid under pressure as well as the necessary structural integrity to support the expected load. The conduits are, with respect to the bearing and the plenum area of the bearing, in a particular, predetermined relative location. When the bearing is in a deflated condition and fluid under pressure is introduced, the initial fluid flows into the bearing and the plenum at a predetermined rate. The deflated bearing structure restricts fluid flow into the plenum until after the bearing is substantially inflated. The controlled flow to the bearing and the plenum allows a substantial pressure differential between the interior of the bearing and the plenum. Upon reaching inflation, fluid under pressure can freely flow into the bearing, into the plenum and between the plenum and the interior of the bearing.

3 Claims, 5 Drawing Figures

SELF REGULATING AIR BEARING

BACKGROUND OF THE INVENTION

Fluid bearings have been used for some time for the transport of heavy or extremely bulky objects. An advantage of the fluid bearing lies in the fact that it may be placed beneath an object and it can, when inflated, transport that object without the requirement of raising the object a great distance from the supporting surface or requiring specialized equipment. An object may thus be moved with little overhead clearance and it is only necessary that the object be capable of sitting upon a platform or cradle which may be supported by the fluid bearing.

One of the difficulties with fluid bearings heretofore known, lies in the fact that if the bearing is inflated to a relative high pressure with respect to the pressure within the plenum, the bearing has a tendency to hop leading to instability. Another difficulty with the air bearing lies in the fact that if the bearing is not properly inflated and the plenum is overpressurized, the bearing does not have sufficient flexibility and give to absorb the slight irregularities of a supporting surface. Still a further difficulty with currently existing bearings lies in the fact that overpressurization of the bearing causes stress wrinkles in the fabric causing areas of excess wear and further affects the uniform flow beneath the bearing surface. An operator would tend to overinflate a bearing when using a surface having unacceptable roughness, for example unsealed concrete, in an attempt to increase the flow beneath the bearing surface.

In an effort to overcome these basic deficiencies, which are evident in the patent to Crowley, U.S. Pat. No. 3,513,936, issued May 26, 1970, an improvement was presented as evidenced by U.S. Pat. No. 3,618,694 issued Nov. 9, 1971 which through the use of a dam like structure, restricted the flow into the plenum until the bearing was at least partially inflated.

With the above noted problems in mind, it is an object of the present invention to provide an improved fluid bearing which, because of its particular structure and because of the method of providing fluid under pressure achieves a proper and uniform inflation of the bearing independent of pressurization of the plenum.

It is another object of the present invention to provide a means for assuring proper pressurization of the bearing and the plenum by means of an inexpensive and simple conduit configuration.

Yet another object of the present invention is to provide a unique means for securing a fluid bearing to its overlying plate or pallet member.

A still further object of the present invention is to provide a fluid bearing which regulates the fluid entering the bearing and diverts the majority of fluid to the plenum to provide greater separation from the operating surface.

Another object of the present invention is to provide a bearing wherein the fluid flow to the plenum and the airbag is carefully controlled permitting high inflation of the plenum and without overly inflating the airbag.

Yet another object of the present invention is to provide separate controls for a fluid bearing such that the relative flow to each may be carefully controlled and selectively terminated.

Still a further object of the present invention is to provide an air bearing including means to control the inflation such that the bearing may be successfully inflated in an unloaded condition under special circumstances.

DETAILED DESCRIPTION OF THE DRAWINGS

Figure 1:
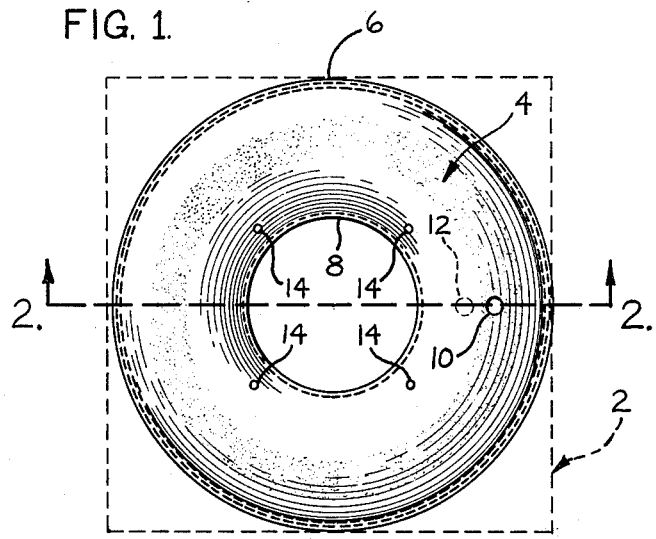
FIG. 1 is a plan view of the invention bearing showing the critical ports and with a typical platform shown in phantom.

As seen in FIG. 1, a typical platform 2, as shown in phantom, would be located above and secured to the bearing generally designated as 4, which as noted hereinafter, is substantially toroidal in shape. The bearing, as seen in this view, has a generally circular outer perimeter and includes a seam 6 whereat the upper and lower separate flexible portions of the bearing are secured together and an inner seam 8 where likewise the upper and lower portions are secured together. It is to be understood that securement between the two portions or sections of the bearing may be done by sewing, bonding or other known means or any combination of these means. An opening 10, as explained in greater detail hereinafter with respect to FIG. 2, extends through the bottom of the overlying platform 2 and the upper portion of the bearing 4. An opening 12 as shown in phantom extends only through the bottom portion of the overlying platform 2 and channels fluid to the plenum of an inflated bearing. A plurality of openings 14 extend through the upper portion of the bearing 4, around its inner periphery radially inwardly from the area of attachment to the platform.

Figure 2:
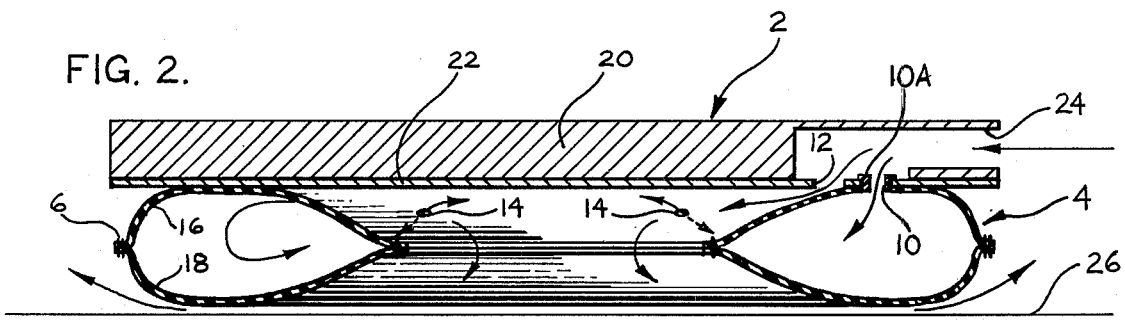
FIG. 2 is an elevational view taken along lines 2—2 of FIG. 1 with the typical platform shown in solid.

Referring now to FIG. 2, a typical rectangular platform 2 is shown in position and the inventive bearing 4 is shown secured in place therebelow. As seen in this view, the seams 6 and 8 secure an upper portion 16 to a lower portion 18 to form a bearing which has the approximate shape of a torus. As seen in this view, the platform 2 has an upper portion 20, typically made out of aluminum, which supports the load and a lower portion 22 to which the bearing is secured as described hereinabove. An opening 24 is located in one edge of the upper portion 20 of the platform 2 to receive a standard connection for air or other fluid under pressure.

The fluid under pressure, as shown by the arrow, flows, when the bearing is fully inflated, inwardly, passing through opening 10 to pressurize the interior of the bearing and inwardly through opening 12 to pressurize the plenum formed by the upper plate 22, the inner surface of the bearing 4 and the supporting surface 26. Once the bearing is inflated, fluid under pressure will flow from the bearing into the plenum and vice versa through the openings 14 depending upon local pressures generated during movement over the supporting surface.

Figure 3:
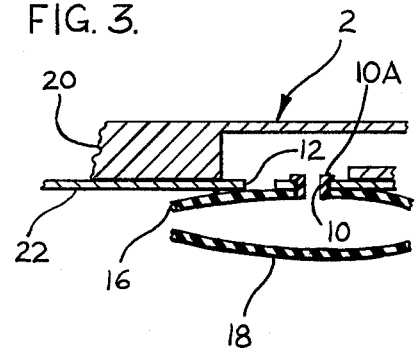
FIG. 3 is an enlarged section of the bearing in the deflated condition.

As seen in FIG. 3, the bearing when deflated, is supported in a condition such that the entire weight will not rest on the bearing by means of any rigid support means well known in the art. When deflated, the upper portion 16 of the bearing 4 contacts the bottom of platform 2 and restricts the port 12 such that upon inflation the initial fluid under pressure moves into the interior of the bearing 4. When the bearing 4 is partially inflated, the upper wall 16 is drawn away from the opening 12 at which time a portion of the fluid under pressure will flow into the plenum much as it does when the bearing is fully inflated.

Figure 4:
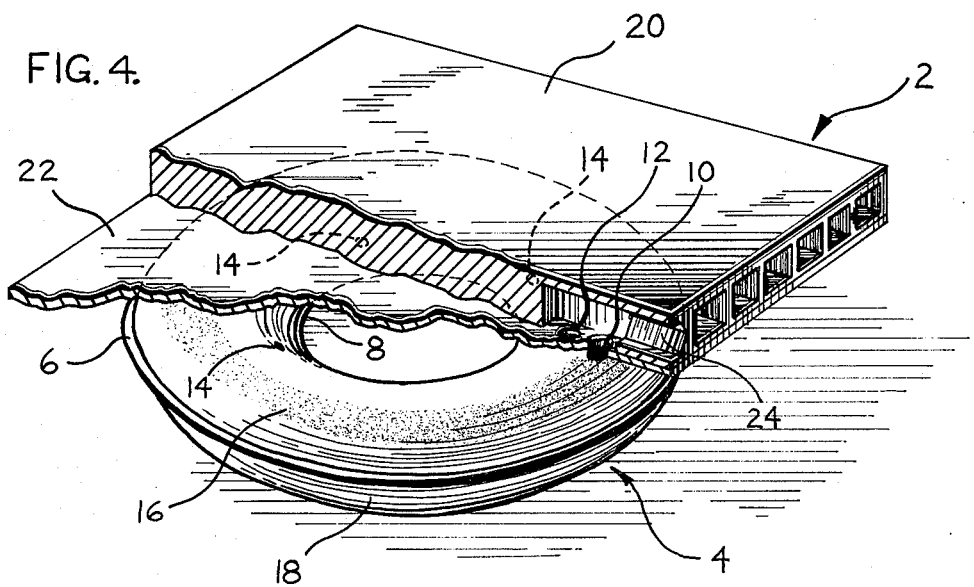
FIG. 4 is a perspective representation, partially broken away, showing the improved bearing and the platform in place.

Referring now to FIG. 4, which is another view of the bearing in inflated condition, the relative location of the various element can more readily be seen.

Figure 5:
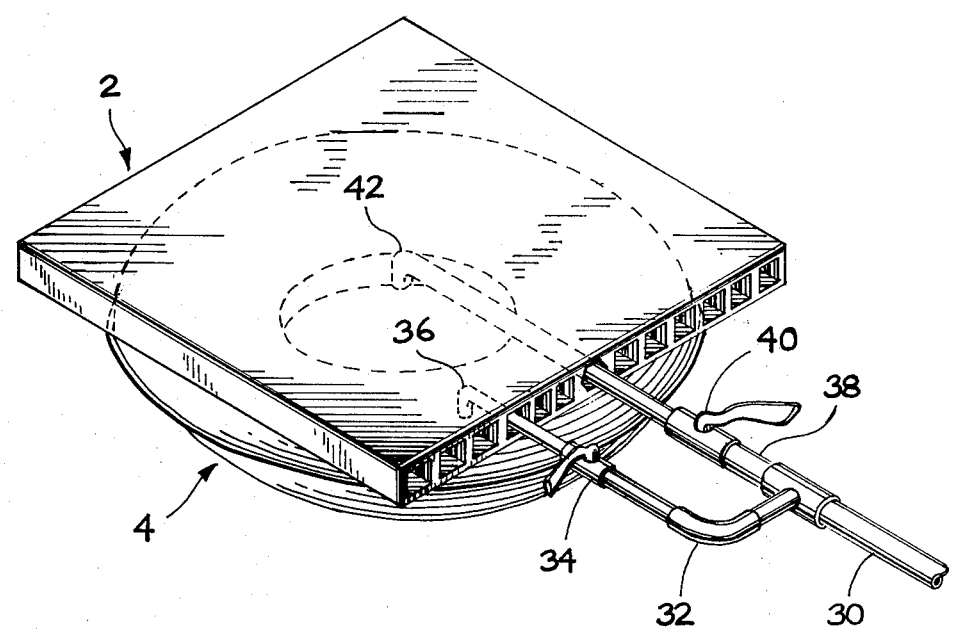
FIG. 5 is an alternative embodiment employing separate valves.

As seen in FIG. 5, additional and more complete control of the relative inflation of the bearing and of the pressure in the plenum may be obtained by utilizing separate control valves. Platform 2 to which fluid bearing 4 is secured has, supplying the fluid under pressure, conduit 30 which branches into a generally smaller conduit 32 having valve 34 and outlet portion 36 leading directly into the interior of the air bearing. The main portion of the conduit 30 is indicated as 38, leads through valve 40 and to outlet 42 leading directly into the plenum.

As is readily obvious, the judicial utilization of valve 34 and 40 allows the plenum to be overpressurized without affecting the configuration of the bearing itself. In the alternate, the judicial utilization of valve 34 allows inflation of the air bearing even when it is not resisted by a load. These possibilities as well as a combination of the two gives a great deal of flexibility to the bearing and allows it under necessary conditions to be utilized much as an air cushion device as opposed to an air bearing.

As noted hereinabove, the location of the ports, and in particular ports 10 and 12, are such that when fluid pressure is applied to a deflated bearing the fluid under pressure will first pass into the bearing partially inflating same. Once the bearing is partially inflated, the fluid will pass into the plenum simultaneously with further pressurization of the bearing itself. The utilization of ports in this fashion allows the bearing to partially raise and support the load prior to the pressurization of the plenum thus preventing escape of a liquid film beneath the bearing before the bearing is inflated sufficiently to support the load. In addition to the resultant, appropriate sequencing of pressurization, the utilization of the ports as described hereinabove enhances the operating characteristics of the bearing and prevents unintentional hop.

What is claimed is:

1. A fluid bearing structure comprising:
a flexible hollow structure having a closed inflatable exterior portion surrounding a central plenum area, said flexible hollow structure including at least one opening in its upper surface to receive fluid under pressure to cause inflation of the hollow structure and at least one other opening to provide communication between the interior of the hollow structure and the plenum;
an overlying, load supporting platform having a substantially flat surface on the lower portion thereof forming an upper boundary of the plenum, said load supporting platform including a conduit for transmitting fluid under pressure, said conduit including a first opening in alignment with the opening in the hollow structure for receiving fluid under pressure and a second opening in communication with the plenum, said second opening being located such that when the bearing is deflated, the upper surface of the hollow structure prevents fluid flow therethrough, preventing pressurization of the plenum until the bearing is partially inflated.

2. An air bearing comprising:
rigid, air impervious platform means to support the desired load, having at least two orifices in its lower surface,
flexible, inflatable peripheral means having an open center such that when the peripheral means is inflated the bearing supporting surface, the platform means and the peripheral means define a plenum for confining fluid under pressure, said peripheral inflatable means having at least one orifice located such that it is in direct communication with contiguous orifices in the lower surface of the platform means when the peripheral means is deflated while simultaneously sealing orifices in the lower surface of the platform means which do not have contiguous openings in the inflatable means,
a source of fluid under pressure interconnected with openings in the bottom of the platform means whereby fluid under pressure supplied to the platform means will firstly fill the peripheral inflatable means and then pressurize the plenum means causing fluid to flow uniformly outwardly beneath the peripheral inflatable means forming a film beneath the peripheral inflatable means and supporting a load on the platform.

3. An air bearing as in claim 2, wherein the fluid under pressure is supplied to the peripheral inflatable means and the plenum by separate selectively controlled conduits.

* * * * *